US006747267B1

(12) United States Patent
Balasubramaniam (10) Patent No.: US 6,747,267 B1
(45) Date of Patent: Jun. 8, 2004

(54) STATIC ATTITUDE MEASUREMENT SYSTEM FOR HEAD SUSPENSION ASSEMBLIES (75) Inventor: Senthil Balasubramaniam, Chaska, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 345 days.

(21) Appl. No.: 09/888,825

(22) Filed: Jun. 25, 2001

(51) Int. Cl.[7] ............................... G02F 1/01; G01J 4/00
(52) U.S. Cl. ..................... 250/225; 356/369; 360/290
(58) Field of Search .............................. 250/225, 216, 250/559.09, 201.5; 356/337, 338, 364, 369; 360/290, 294

(56) References Cited

U.S. PATENT DOCUMENTS

| 5,480,775 A | 1/1996 | Ito et al. |
| 5,636,013 A | 6/1997 | Swift |
| 5,929,987 A | 7/1999 | Hayes |
| 5,995,215 A | 11/1999 | Hayes |

OTHER PUBLICATIONS

IBM Technical Disclosure Bulletin, "Head/Suspension Assembly Static Pitch/Roll Angle Tester", p. Nos. 461–462, vol. No. 37, issue No. 5, May 1, 1994.*

* cited by examiner

*Primary Examiner*—Kevin Pyo
(74) *Attorney, Agent, or Firm*—Faegre & Benson LLP (57) ABSTRACT

A static attitude measurement device measures the static attitude of a target, such as a head suspension assembly or component, and reduces the possibility of measurement errors due to stray spots and internal reflections. The device includes a light source for producing a light beam, a beam splitter for directing the light beam toward the target from which a reflected beam is returned, a detector for detecting the reflected beam at a predetermined polarization state and a polarization component for producing the predetermined polarization state in the reflected beam, the polarization component positioned between the beam splitter and the target. The polarization component preferably is a quarter-wave plate to produce a reflected beam that is orthogonally polarized with respect to the incident beam. In addition, the directional optics preferably include a polarizer positioned between before the beam splitter to reduce reflection off of the light source.

34 Claims, 5 Drawing Sheets

STATIC ATTITUDE MEASUREMENT SYSTEM FOR HEAD SUSPENSION ASSEMBLIES

FIELD OF THE INVENTION

This invention relates to systems for measuring static attitude (orientation angle) of portions of head suspension assemblies.

BACKGROUND OF THE INVENTION

Head suspension assemblies ("HSAs") position a read/write head over the spinning surface of a data storage device (e.g. a magnetic hard disk). HSAs are some of the smallest and most delicate components of a rigid disk drive. An HSA includes a suspension assembly, an elongated spring structure, with a head assembly positioned at a distal end. Suspension assemblies act in a similar fashion to the needle arm in a record player, positioning the head assembly nanometers from the surface of a spinning disk in the disk drive. Typical suspension assemblies measure less than 20 mm long and are 0.03 to 0.1 mm thick. Suspension assemblies generally include an elongated load beam with a flexure located at a distal end and a base plate or other mounting structure located at a proximal end.

The flexure comprises a head bonding platform suspended by spring arms. The head assembly is mounted to this head bonding platform. The head assembly includes an air bearing slider and a read/write magnetic transducer formed on the slider. The slider is aerodynamically shaped to use the air stream generated by the spinning disk to produce a lift force. During operation of the disk drive, the spring arms provide gimballing motion to maintain the head assembly at a desired orientation with respect to the surface of the disk. The suspension assembly must balance the different lift forces on the outside and the inside air-bearing surfaces of the slider (the outside circumference of a round disk has a faster linear velocity than the inside, and therefore produces more lift), static forces (e.g. weight and pressure applied on the slider by the suspension assembly), and dynamic forces (e.g. momentum). The flexure and the whole HSA are manufactured within precise tolerances.

In a magnetic disk drive, the density and accuracy of the data stored on the disk depend on the distance (referred to as "Z-height") and orientation (referred to as "static attitude") of the head assembly with respect to the surface of the disk. The size of the magnetic field "spot" written and read by the transducer is directly proportional to the square power of the Z-height distance between the transducer and the disk. Small changes in distance and/or attitude can cause the head assembly to "crash", that is, to hit the surface of the spinning disk. A crash can destroy both the transducer and the data on the surface of the disk. Tight manufacturing tolerances are a factor in determining disk drive reliability.

HSA manufacturers must repeatedly measure and control the Z-height and static attitude of different elements of the HSA at various points during the manufacturing process. The reference point for both the Z-height and the static attitude measurements is a manufacturing datum plane. The manufacturing datum plane is a horizontal plane representing a suspension mounting surface of an actuator. During manufacturing, the manufacturing datum plane is placed generally parallel to and below the suspension assembly.

A static attitude measurement includes a pitch axis angle measurement and a roll axis angle measurement measured in relation to the datum plane. The pitch and the roll axes are parallel to the horizontal plane and are mutually perpendicular, intersecting at a point on the head bonding platform. The roll axis is usually aligned with the longitudinal axis of the suspension assembly.

Static attitude can be measured using autocollimation systems. Autocollimation systems are measuring instruments that generate a collimated light beam (a light beam having parallel rays of light) having a relatively large diameter. The collimated light beam is directed to and reflected off of the surface of the part being measured. The reflected light beam strikes a linear array of light sensors. The sensors collect data on the reflected light beam which is fed into a computer to calculate the pitch and roll angles of the part. Autocollimation systems offer accurate and fast angle measurements.

In many instances, both the Z-height and the static attitude are measured by the same instrument in order to save time and space in the manufacturing process, as well as reduce errors in the measurement procedure. A single light source, such as a laser, produces a beam of light which is then split by a beam splitter into a first beam used to measure the Z-height and a second beam used to measure the static attitude. The second beam is directed by additional optics toward the head suspension target. This beam is then reflected back off the target and back to a detector.

Figure 1:
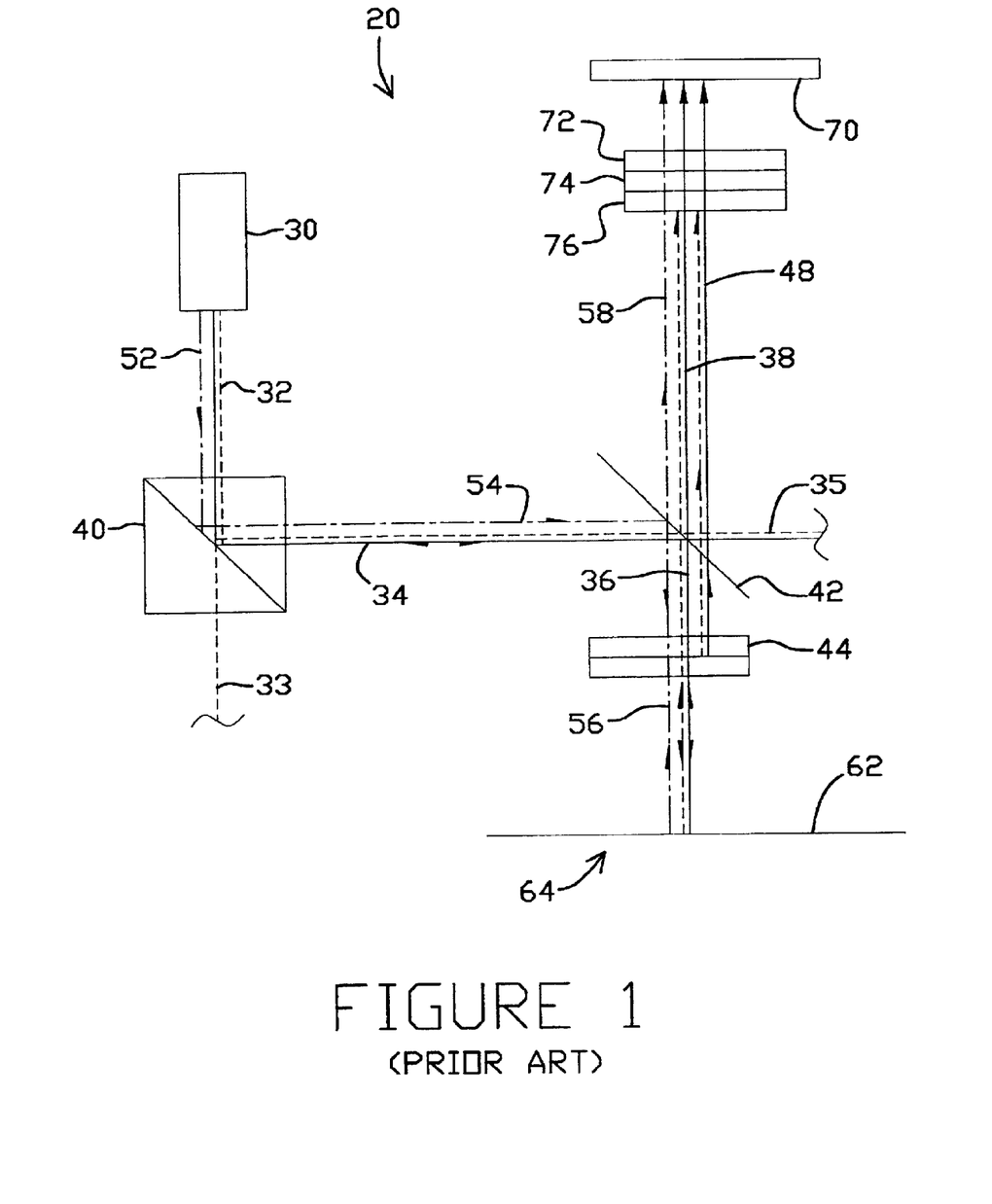
FIG. 1 is a schematic view of a prior art static attitude measurement device.

As shown in FIG. 1, a prior art static attitude measurement system 20, such as a WYKO™ SAT probe produced by Veeco Instruments Inc., Plainview, N.Y., includes a light source 30 to produce a light beam 32. Light beam 32 is typically linearly polarized at an angle, which is a combination of two components, one at a first polarization state (as represented by a solid line) and one at a second polarization state (as represented by a dashed line). System 20 also includes a beam splitter 40 that splits beam 32, passing a first beam 33 and reflecting a second beam 34. Due to the angle of incidence of beam 32 on beam splitter 40 and other reasons, the first beam 33 almost exclusively contains light in the second state of polarization, which is directed toward optics (not shown) and used for measuring Z-height of a suspension 64. The second beam 34, however, is a mixed beam and primarily includes light in the first state of polarization, but also some light in the second state of polarization. This second beam 34 is directed toward a second beam splitter 42. A beam reducer (not shown) may optionally be located between the first and second beam splitters 40, 42, in order to reduce the diameter of the beam 34.

The second beam splitter 42 splits the beam 34 by passing a beam 35 and directing a beam 36 orthogonally toward the suspension 64 to measure the attitude on a surface 62 of the suspension 64. Beam 36 is reflected off of the surface 62 and travels back in the opposite direction of the incoming beam. Beam 36 passes through some collection optics 44, such as a pair of lenses, when traveling toward and away from the suspension 64.

When returning beam 36 encounters the second beam splitter 42, a portion 38 of the beam 36 passes through and a portion is reflected back toward the first beam splitter 40. The passed portion 38 then encounters a series of optics 72, 74, 76 that filter out unwanted light, before the beam 38 strikes a detector 70. In particular, optics 76, such as a polarized filter, stops the second state polarized light portion in beam 38, but passes the primary portion in the first state of polarization. The information collected by the detector 70 is then used by a computer or other instrument to calculate the static attitude of the suspension 64.

Although the provided system is effective in producing static attitude measurements, there are some side effects to the optics that create problems with the system. As stated above, when the returning beam 36 encounters the second beam splitter 42, a portion of the beam is reflected back toward the first beam splitter 40. Because beam 36 primarily includes light at the first polarization state, the majority of this reflected, secondary beam is also at the first polarization state. If this secondary beam is strong enough, due to the surface 62 being highly reflective or other reasons, this beam may be reflected back toward the light source 30 by the first beam splitter 40. This beam then reflects off the light source 30, shown as phantom beam 52, which then is split at beam splitter 40 into beam 54, which is then split and directed by second beam splitter 42 toward the suspension 64 as beam 56. Beam 56 is then reflected off the surface 62 in a manner similar to that of beam 36. As a result, a portion 58 of reflected beam 56 is directed through the optics 72, 74, 76 to the detector 70, thereby causing a second measurement or stray spot at the detector 70. When the target being measured is highly reflective, this stray spot may be as bright as the primary spot, which can cause a substantial problem in the static attitude measurement of the suspension 64.

In addition, the collection optics 44 can cause an internal reflection resulting in a reflected beam 48 which may also reach the detector 70. If the flu reflectivity of the suspension 64 is low and the true reflected spot from beam 38 is not very bright, then the software controlling the detector 70 will not be able to differentiate between the true reflected spot and the internal reflection, and thus an erroneous measurement may occur. In addition, the internal reflection 48 and stray spot 58 may tend to be as bright or brighter than the actual measurement beam 38, and therefore cannot be easily filtered out without blocking out the desired measurement beam 38. Therefore, there is a need to reduce and/or eliminate the stray spot and internal reflection problems of the current static attitude measurement devices in order to improve the measurement capability of these devices.

SUMMARY OF THE INVENTION

The present invention is a static attitude measurement device for measuring the static attitude of a head suspension target while reducing measurement errors due to stray spots and internal reflections. The device includes a light source for producing a light bean, a beam splitter for directing a first portion of the light beam toward a target from which a reflected beam is returned, and a detector for detecting the reflected beam at a predetermined polarization state. A polarization component for producing the predetermined polarization state in the reflected beam, which is preferably a quarter-wave plate, is then positioned between the beam splitter and the target. As a result, the light beam passes through the quarter-wave plate before encountering the target and the reflected beam passes through the quarter-wave plate before encountering the detector. Such double passage results in the reflected beam being orthogonally polarized with respect to the original light beam, which is also the predetermined polarization state.

Unfortunately, as the reflected beam passes back through the beam splitter, a portion of this beam may be reflected back toward the light source, from which it may be reflected and directed again toward the target. However, when this stray beam makes a double passage through the quarter-wave plate, it is again orthogonally polarized and returns to the original polarization state of the light beam. As a result, it is not in the predetermined polarization state and is thus excluded from striking the detector and causing stray spot errors in the measurement device.

When the measurement device includes collection optics positioned between the beam splitter and the target, such as one or more lenses, internal reflections off of these collection optics may occur as the light beam passes through the collection optics. However, by positioning the quarter-wave plate between the collection optics and the target, the internal reflection beams do not pass through the quarter-wave plate on their way toward the detector. Therefore, the internal reflection beams are usually not in the predetermined polarization state and thus are excluded from striking the detector and causing errors in the measurement device.

Use of a polarizing beam splitter may also help to reduce stray spot and internal reflection errors. In addition, the positioning of a polarizer between the light source and the beam splitter helps limit the polarization state of the beam directed toward the target, thus also helping to reduce stray spot and internal reflection errors.

In a combined measurement device that measures both static attitude and Z-height of a head suspension target, the light source is split into two components having primarily opposite polarization states. A second quarter-wave plate may be positioned in line with the Z-height light beam portion before the target so that any scattered reflected Z-height light off of the target will end up passing through two quarter-wave plates. Therefore, the polarization state of this reflected Z-height light is changed so that it is not in the predetermined polarization state and will not cause errors in the static attitude measurement.

The present invention also includes a method of measuring the static attitude of a head suspension target while reducing measurement error due to stray spots, internal reflections and/or stray Z-height measurement light.

DETAILED DESCRIPTION OF THE INVENTION

With reference to the attached Figures, it is to be understood that like components are labeled with like numerals throughout the several Figures. It is also to be understood that schematic illustrations are not intended to be to scale, and that dimensions are exaggerated in order to illustrate the invention.

Figure 2:
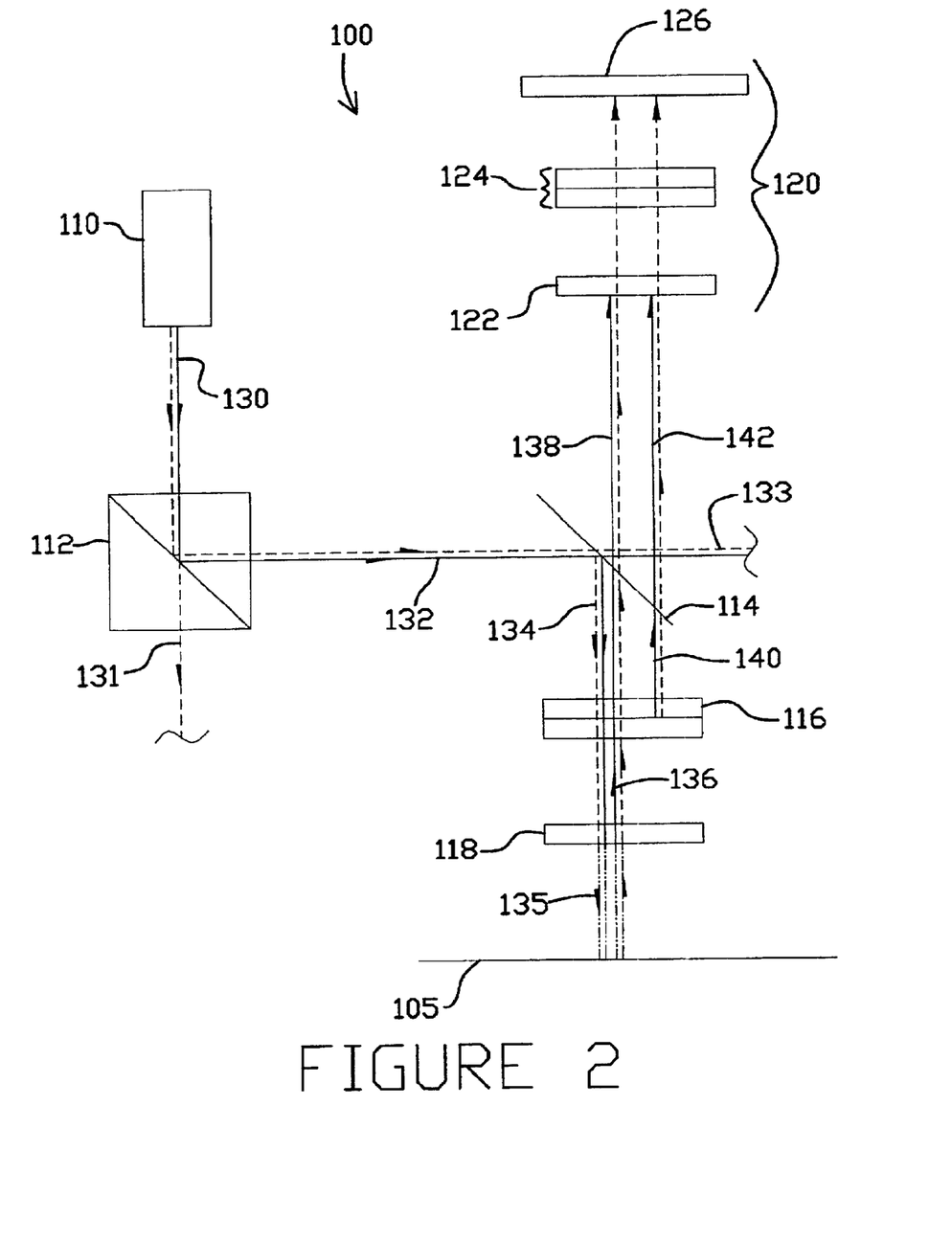
FIG. 2 is a schematic view of one embodiment of a static attitude measurement device in accordance with the present invention, illustrating an internal reflection situation.

FIG. 2 is a schematic showing an embodiment of a static attitude measurement device 100, in accordance with the present invention, for measuring the static attitude of a target 105 with reduced or eliminated stray spot and internal reflection errors. Although occurring contemporaneously, stray spot and internal reflection effects are illustrated and discussed separately for clarity. The measurement device 100 includes a single light source 110 that produces a light beam 130, such as a laser diode or other suitable device. Beam 130 encounters a first beam splitter 112 that reflects a first beam portion 132 as a mixed beam that primarily includes light at the first polarization state, but also including a small amount of light at the second polarization state. First beam splitter 112 passes a second beam portion 131 to be used for Z-height measurement if desired (as described in the Background section with respect to FIG. 1). Beam 132 then encounters a second beam splitter 114, such as a 50% mirror, half-silvered mirror or other suitable device, that passes a portion 133 that is not utilized and reflects a portion 134 toward the target 105. Reflected beam 134 passes through collection optics 116, such as one or more lenses for focusing the light beams, before encountering target 105.

In this embodiment, beam 134 is also passed through a quarter-wave plate 118, which causes the beam 135 to become circularly polarized before encountering and reflecting off of the target 105. Reflected beam 135 then passes again through quarter-wave plate 118, causing beam 136 to be linearly polarized orthogonal to beam 134. Beam 136 then travels back through the collection optics 116 toward the second beam splitter 114. As a result of double passage through the quarter-wave plate 118, beam 136 primarily includes light at the second polarization state with a small amount of light at the first polarization state (being orthogonally polarized with respect to the incoming beam 134). The beam splitter 114 then passes a portion 138 of the orthogonally polarized beam toward detection optics 120. Detection optics 120 are shown to include a number of optical devices, such as analyzer 122 (such as a second polarizer), optics 124 (such as N D filters or other optical devices) and detector 126. In this embodiment, analyzer 122 is configured to pass light in the second polarization state, such as the primary portion of beam 138, but exclude light in other polarization states. Therefore, the primary portion of beam 138 passes through analyzer 122 and optics 124 to strike detector 126, from which the static attitude of the target 105 may be determined by an external device, such as a computer or other suitable device.

As described in the Background section, as beam 134 passes through collection optics 116, an internal reflection beam 140 occurs, which also ends up passing through second beam splitter 114. Since beam 134 primarily includes light in the first polarization state, internal reflection beam 140 also primarily includes light in this first polarization state, and since internal reflection beam 140 does not pass through the quarter-wave plate 118, it does not change its polarization state. Therefore, in this embodiment, when internal reflection beam 142 encounters detection optics 120, analyzer 122 stops the primary portion of beam 142 because only light in the second polarization state may pass. Thus, the primary portion of internal reflection beam 142 fails to strike detector 126 and no erroneous measurement due to this internal reflection will occur. Unfortunately, there is a small portion of beam 142 that includes light at the second polarization state, which then does manage to pass on to the detector 126. However, this portion will be at a much lesser intensity causing a less intense spot on the detector 126, such that the device 100 is more readily able to distinguish the primary spot caused by beam 138 from the lesser internal reflection spot caused by beam 142.

Figure 3:
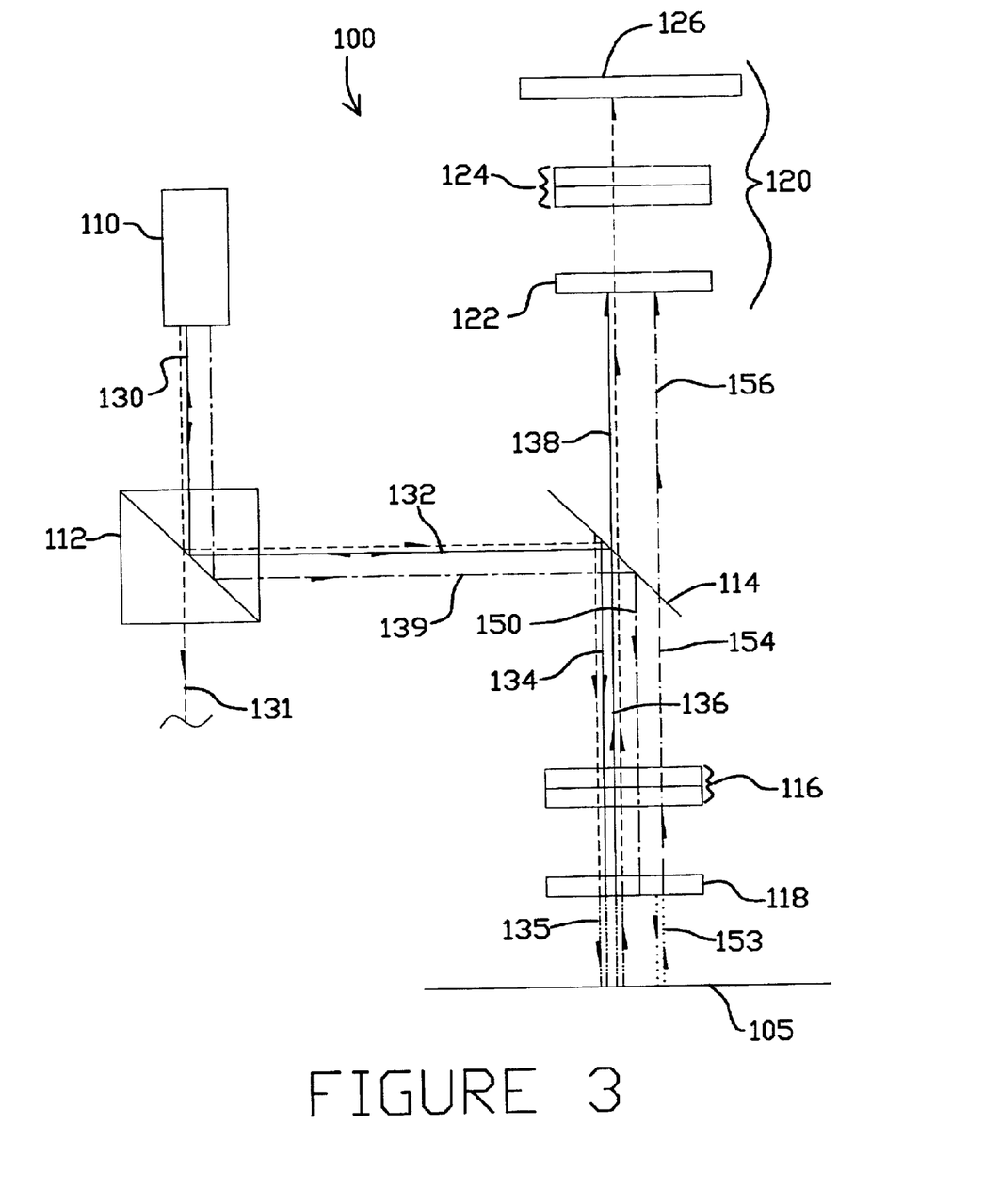
FIG. 3 is another schematic view of the embodiment shown in FIG. 2, illustrating a stray spot situation.

Referring now to FIG. 3, static attitude measurement device 100 is again shown including the same components as in FIG. 2. Beam 130 produced by light source 110 is directed using beam splitters 112 and 114 toward target 105, as described above. When orthogonally polarized beam 136 passes from quarter-wave plate 118, through collection optics 116, to strike second beam splitter 114, beam portion 138, primarily including light at the second polarization state, passes on to strike detector 126 and provide the basis for the static attitude measurement. In addition, a second portion 139 is reflected by second beam splitter 114 back toward first beam splitter 112 and then to the light source 110.

In this embodiment, the second portion 139 is orthogonally polarized as it travels back to and reflects off of the light source 110, and thus is a mixed beam primarily including light at the second polarization state (as illustrated by the dot-dash line). Upon its return toward the target 105, a portion of the returning beam 150 is reflected off of the second beam splitter 114. Beam 150 is thus orthogonally polarized when it encounters the quarter-wave plate 118, traveling toward and away from the target as beam 153. The double passage through the quarter-wave plate 118 causes the primary portion of the resulting reflected returning beam 154 to shift back to the first polarization state as it heads toward second beam splitter 114 (as illustrated by the dot-dash-dash line). The passed beam portion 156 is then stopped by analyzer 122, which only passes beams in the second state of polarization, and does not reach detector 126. The minor portion of beam 139 at the first polarization state, which gets shifted back to the second polarization state by double passage through the quarter-wave plate 118, is too weak relative to the primary portion of the beam to cause any significant problems or errors in the device. Therefore, beam 156 does not cause. a stray spot on detector 126 and the resulting measurement errors.

With this embodiment, repetitive reflections of the beams appear to be possible, with every other repetition resulting in a primary beam portion at the second state of polarization. However, due to the beam splitters provided, this repetitive reflection beam becomes too weak to cause errors in the measurement or other problems with the device.

In a similar manner as described in connection with FIG. 2, as returning beam 150 passes through collection optics 116, an internal reflection beam (not shown) that is also primarily at the second state of polarization may be produced. If so, such orthogonally polarized internal reflection beam would not be stopped by analyzer 122 and could cause an error when striking detector 126. Since this internal reflection beam would tend to be of lesser intensity than the desired beam 138, errors may be reduced by configuring the detector 126 for higher intensity beams.

As illustrated and described for the embodiment in FIGS. 2 and 3, manipulation of the polarization of the light source beam as it travels to and is reflected off of the target may result in a reduction and/or elimination of errors caused by stray spots within the measurement device 100. However, because of the partial reflectivity of second beam splitter 114, undesired loss of light intensity and creation of internal reflections may still occur.

Figure 4:
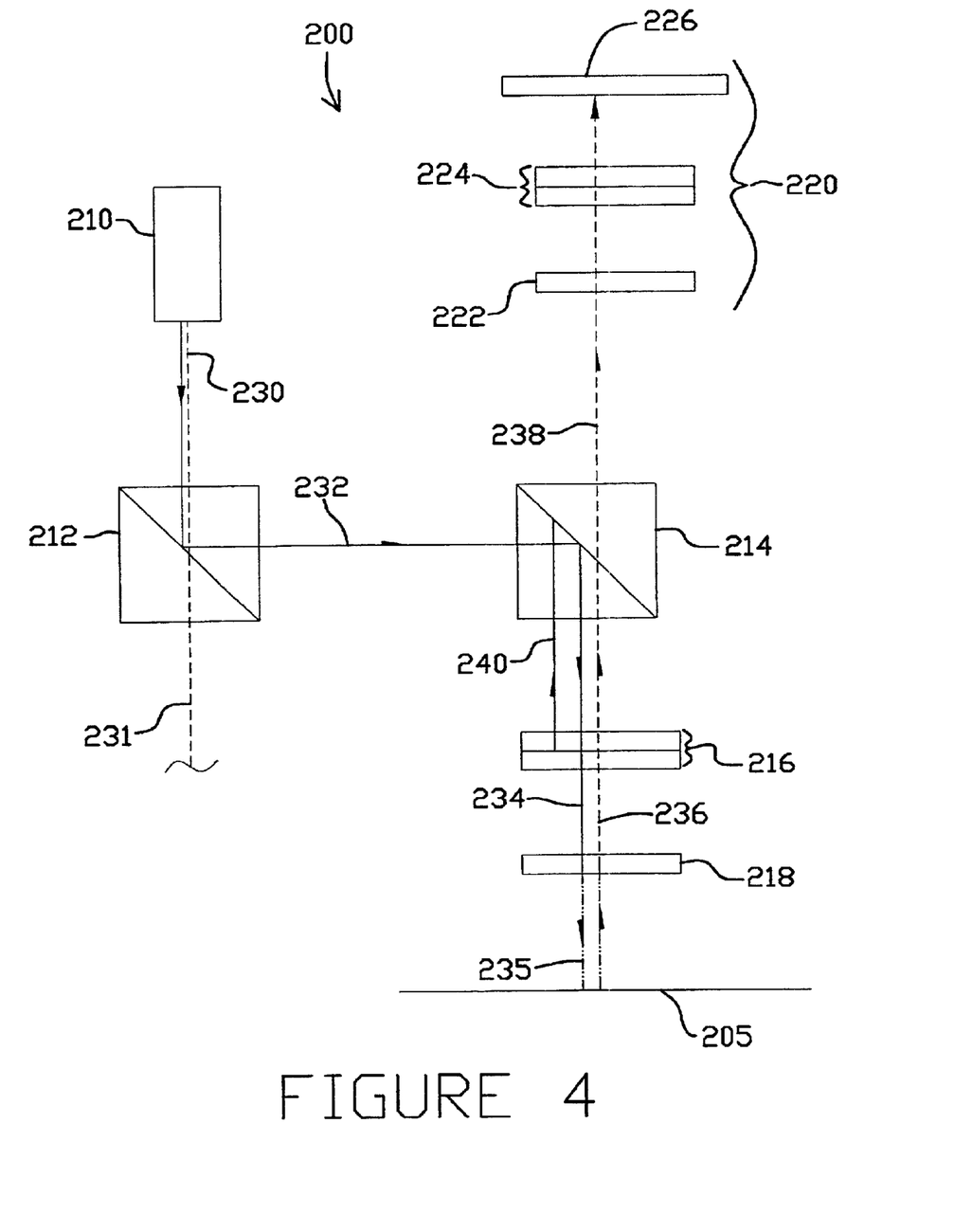
FIG. 4 is a schematic view of another embodiment of a static attitude measurement device in accordance with the present invention, illustrating both internal reflection and stray spot situations.

Referring now to FIG. 4, another embodiment of a static attitude measurement device 200 is shown for measuring the static attitude of target 205. This device 200 includes a light source 210 for producing a light beam 230 and a first beam splitter 212 for splitting beam 230 into two usable portions, one portion 231 for Z-height measurement, if desired, and a portion 232 for static attitude measurement. In this embodiment, beam splitter 212 is a polarizing beam splitter that passes portion 231 at the second polarization state and reflects portion 232, which is a mixed beam that is primarily at the first polarization state. Beam 232 is directed toward second reflecting and splitting device 214. In this embodiment, device 214 is also a polarizing beam splitter that reflects all of beams in the first polarization state and passes all of beams in the second polarization state. Therefore, only the portion of mixed beam 232 at the first polarization state will be reflected toward the target 205 and the small portion, if any, at the second polarization state will be passed and unused. Since substantially all of the first polarization state portion of beam 232 is reflected toward the target 205, as beam 234, no significant loss of intensity or beam strength occurs. This increases the intensity of the beam reaching the target 205, as compared with the prior art device.

Beam 234 then passes through collection optics 216 and encounters a quarter-wave plate 218 causing the beam 235 to become circularly polarized before encountering and reflecting off of the target 205. Reflected beam 235 then passes again through quarter-wave plate 218, causing beam 236 to be linearly polarized orthogonal to beam 234 and thus in the second polarization state. Beam 236 is then directed back through collection optics 216 toward polarizing beam splitter 214. Upon encountering polarizing beam splitter 214, substantially all of beam 236 is passed toward detection optics 220, as beam 238. Analyzer 222 is configured to pass only beams in the second polarization state, such that beam 238 strikes detector 226 to provide the basis for the static attitude measurement.

Since substantially all of beam 236 passes through polarizing beam splitter 214, there is no reflected beam to travel back toward light source 210. Thus, there is no beam to cause a stray spot and a resulting error in the static attitude measurement.

An internal reflection beam 240 in the first polarization state is created, however, as beam 234 passes through collection optics 216. Since use of the polarizing beam splitter 214 reflects all of light in the first polarization state, none of this internal reflection beam 240 is passed on toward the detection optics 220, and thus no error occurs directly because of this internal reflection. Reflection of the internal reflection beam 240 back toward the light source 210, nonetheless, may result in a portion being reflected back to the target 205, potentially causing a stray spot problem. However, the weakening of the beam 240 as it travels this path reduces the likelihood of stray spot or other measurement errors.

Figure 5:
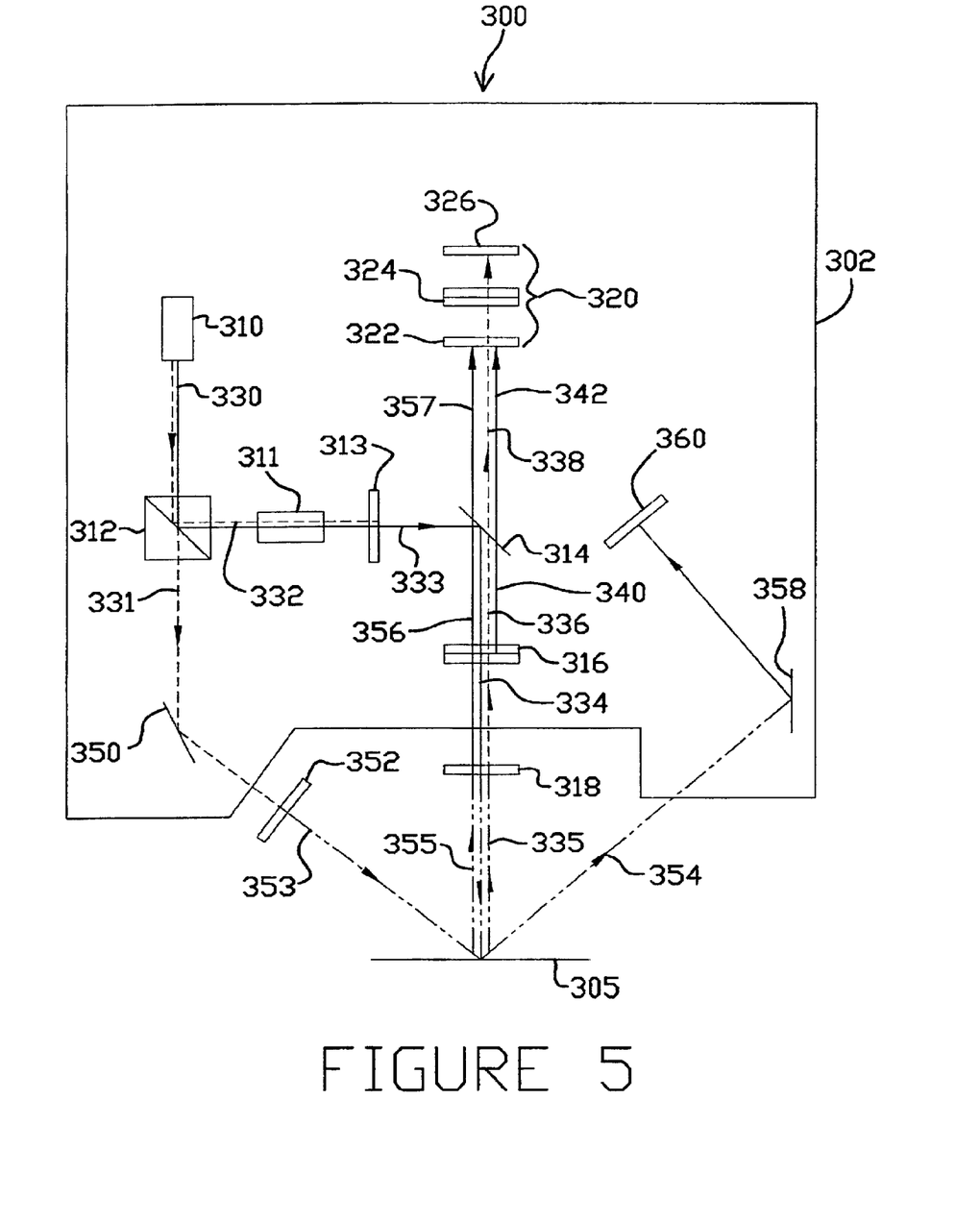
FIG. 5 is a schematic view of yet another embodiment of a static attitude measurement device in accordance with the present invention, illustrating both the Z-height and static attitude measurement portions of the device.

Referring now to FIG. 5, yet another embodiment of a static attitude measurement device 300 for measuring the static attitude of a target 305 is shown, in accordance with the present invention. An outline 302 representing the perimeter of the device 300 is also shown. Included in this embodiment is a light source 310 for producing a light beam 330. Beam 330 is split at beam splitter 312 by passing beam 331, which is predominantly at the second polarization state, and reflecting beam 332, which is a mixed beam that primarily includes light at the first polarization state with some second polarization state light. Beam 331 is used for the Z-height measuring system, and is discussed in more detail below.

Beam 332 is passed through a beam reducer 311 to narrow the beam diameter, and then through a polarizer 313. Polarizer 313 effectively limits the mixed beam 332 to a beam 333 at the first polarization state. Beam 333 then encounters beam splitter 314, similar to beam splitters 42 and 114, described above. A portion 334 of the first polarization state beam is reflected by the beam splitter 314 toward the target 305, through collection optics 316 and quarter-wave plate 318. A beam 335 strikes the target 305 and is reflected back through the quarter-wave plate 318 toward the collection optics 316 as beam 336, which is now orthogonally polarized with respect to beam 334 and is at the second polarization state. A portion 338 of the beam 336 is passed through the second beam splitter 314 and continues on to pass through detection optics 320 and strike detector 326.

Another portion (not shown) of beam 336 is reflected at the second beam splitter 314 back toward the light source 310, but is stopped by the polarizer 313, which only allows the passage of selected light beams in one direction. Therefore, the potential for stray spot problems due to reflection off of the light source is minimized.

An internal reflection beam 340 may be created at the collection optics 316 when beam 334 passes through, but since beam 340 and the portion 342 passed through second beam splitter 314 are both at the first polarization state, beam 342 is stopped by analyzer 322, which only allows beams at the second polarization state to pass. Therefore, errors due to internal reflections are also effectively minimized.

As described above and in the Background section, beam 331 is available for use in measuring the Z-height of target 305. Beam 331 is typically directed by a mirror 350, or other suitable device, toward the target 305, from which it is reflected toward a second mirror 358 and then to a sensing device 360. The data collected by sensing device 360 is processed to determine the Z-height measurement of target 305. When the beam 331 reflects off of the target 305, it is possible to get scatter, resulting in a light, such as beam 355, entering into the static attitude portion of the measurement device 300. Since beam 355 is linearly polarized, when it passes through quarter-wave plate 318 it becomes circularly polarized and a portion of it may pass through analyzer 322 and reach the detector 326.

In order to reduce this possibility, a quarter-wave plate 352 is added to the Z-height portion of the device 300 between the first mirror 350 and the target 305. Beam 331 becomes circularly polarized resulting in beam 353 being reflected off of the target 305 and passing on to the sensing device 360 as beam 354. Any scattered circularly polarized beams 355 become orthogonally polarized with respect to beam 331 at quarter-wave plate 318. The resulting beam 356 is at the first polarization state with a portion 357 being passed through second beam splitter 314. Beam 357 is then stopped by analyzer 322, thus limiting the possibility of measurement errors due to cross talk between the two measuring systems with the measuring device 300.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A static attitude measurement device for measuring the static attitude of a head suspension target while reducing measurement errors due to stray spots and internal reflections, the device comprising:

a light source for producing a light beam;

a beam splitter for directing a first portion of the light beam toward a target from which a reflected beam is returned;

a collection optic positioned between the beam splitter and the target;

a detector for detecting the reflected beam at a predetermined polarization state; and a polarization component for producing the predetermined polarization state in the reflected beam, the polarization component positioned between the beam splitter and the target.

2. The measurement device of claim 1, wherein the polarization component comprises a quarter-wave plate.

3. The measurement device of claim 2, wherein the beam splitter comprises a first beam splitter and the device further comprises a second beam splitter position between the light source and the first beam splitter.

4. The measurement device of claim 3, wherein the second beam splitter comprises a polarizing beam splitter.

5. The measurement device of claim 3, wherein the first beam splitter comprises a polarizing beam splitter.

6. The measurement device of claim 3, further comprising a polarizer positioned between the first and second beam splitters.

7. The measurement device of claim 6, further comprising a beam reducer positioned between the first beam splitter and the polarizer.

8. The measurement device of claim 1, further comprising collection optics positioned between the beam splitter and the quarter-wave plate, the collection optics including at least one lens for focusing the first portion of the beam.

9. The measurement device of claim 1, wherein the beam splitter is positioned between the target and the detector.

10. The measurement device of claim 1, wherein the static attitude measurement device also measures Z-height of the target and wherein the device further comprises:

a Z-height detector for detecting a Z-height reflected beam; and a Z-height directional component for directing a second portion of the light beam toward the target from which the reflected beam from the target is directed toward the Z-height detector.

11. The measurement device of claim 10, further comprising a polarization component positioned between the Z-height directional component and the target for changing the polarization state of the second portion of the light beam prior to encountering the target.

12. The measurement device of claim 1, wherein the light source comprises a polarized laser.

13. The measurement device of claim 1, wherein the detector comprises a polarizer that passes substantially only light in the predetermined polarization state.

14. A method for measuring the static attitude of a head suspension target while reducing measurement errors due to stray spots and internal reflections, the method comprising the steps of:

providing a light beam;

directing, by a beamsplitter, the beam onto a target from which a reflected beam is returned;

collimating the beam directed onto the target;

placing a collection optic between the beamsplitter and the target;

producing a predetermined polarization state in the reflected beam by passing the beam and the reflected beam through a first polarization component; and detecting the reflected beam at the predetermined polarization state.

15. The method of claim 14, wherein the step of detecting comprises providing a detector that detects the reflected beam at the predetermined polarization state and providing a polarizer that passes substantially only light in the predetermined polarization state.

16. The method of claim 14, wherein the first polarization component comprises a quarter-wave plate through which the beam and reflected beam are passed to produce a predetermined polarization state in the reflected beam that is orthogonally polarized with respect to a polarization state of the beam.

17. The method of claim 14, wherein the step of directing comprises passing the beam through a beam splitter before encountering the target.

18. The method of claim 17, wherein the beam splitter comprises a polarizing beam splitter which passes substantially only light in the predetermined polarization state and reflects substantially all other light.

19. The method of claim 17, further comprising passing the beam through a polarizer positioned before beam splitter to substantially block light at undesired polarization states.

20. The method of claim 14, wherein the method is also for measuring the Z-height of the target, and wherein the method further comprises directing a portion of the beam onto the target from which a reflected Z-height beam is returned and detecting the reflected Z-height beam to determine the Z-height of the target.

21. The method of claim 20, further comprising the step of producing a desired polarization state in the reflected Z-height beam such that any reflected Z-height beam directed toward the detector for the static attitude measurement is not in the predetermined polarization state.

22. The method of claim 21, wherein the step of producing comprises passing the portion of the beam through a second polarization component before the portion of the beam encounters the target, such that any portion of the reflected Z-height beam directed toward the detector for the static attitude measurement also passes through the first polarization component producing a polarization state in the reflected Z-height beam that is substantially not the predetermined polarization state.

23. In a static attitude measurement device for measuring the static attitude of a head suspension target, the device including a light source for producing a light beam, first and second beam splitters for directing the light beam toward the target from which a reflected beam is returned, and a detector for detecting light at substantially only a predetermined polarization state with the detector positioned to intercept the reflected beam, the improvement comprising a collection optic positioned between the second beam splitter and the target and a quarter-wave plate positioned between the collection optic and the target for producing the predetermined polarization state in the reflected beam.

24. The improvement of claim 23, further comprising a polarizer positioned between the first and second beam splitters for reducing light in an unwanted polarization state from reaching the quarter-wave plate and the target.

25. In a combined static attitude and Z-height measurement device for measuring the static attitude and Z-height of a head suspension target, the device including a light source for producing a light beam, a first beam splitter for producing first and second portions of the light beam, a second beam splitter for directing the first portion of the light beam toward the target from which a static attitude reflected beam is returned, a first detector for detecting light at substantially only a predetermined polarization state with the detector positioned to intercept the static attitude reflected beam, at least one directional component for directing the second portion of the light beam toward the target from which a Z-height reflected beam is returned and a second detector positioned to intercept and detect the Z-height reflected beam, the improvement comprising:

a collection optic positioned between the second beam splitter and the target;

a first quarter-wave plate positioned between the second beam splitter and the target for producing the predetermined polarization state in the static attitude reflected beam; and a second quarter-wave plate positioned before the target for producing a desired polarization state in the second portion of the light beam before it encounters the target.

26. The improvement of claim 25, further comprising a polarizer positioned between the first and second beam splitters for reducing light in an unwanted polarization state from reaching the first quarter-wave plate and the target.

27. The measurement device of claim 1, wherein the collection optic comprises a lens.

28. The measurement device of claim 1, wherein the polarization component is disposed between the collection optic and the target.

29. The measurement device of claim 1, wherein the polarization component is disposed to pass both the beam from the beam splitter to the target and reflected beam from the target to the detector.

30. The measurement device of claim 2, wherein the collection optic comprises a lens.

31. The measurement device of claim 1, wherein the quarter-wave plate is disposed between the collection optic and the target.

32. The measurement device of claim 1, wherein the quarter-wave plate is disposed to pass both the beam from the beam splitter to the target and reflected beam from the target to the detector.

33. The method of claim 14, wherein the collimating step comprises placing a collection optic in a path of the beam directed onto the target.

34. The method of claim 33, wherein the collimating step is carried out before the step of producing a predetermined polarization state.

* * * * *